W. R. GREEN.
SHEET METAL FORMING MACHINE.
APPLICATION FILED AUG. 19, 1912.
1,068,893.
Patented July 29, 1913.
2 SHEETS—SHEET 1.
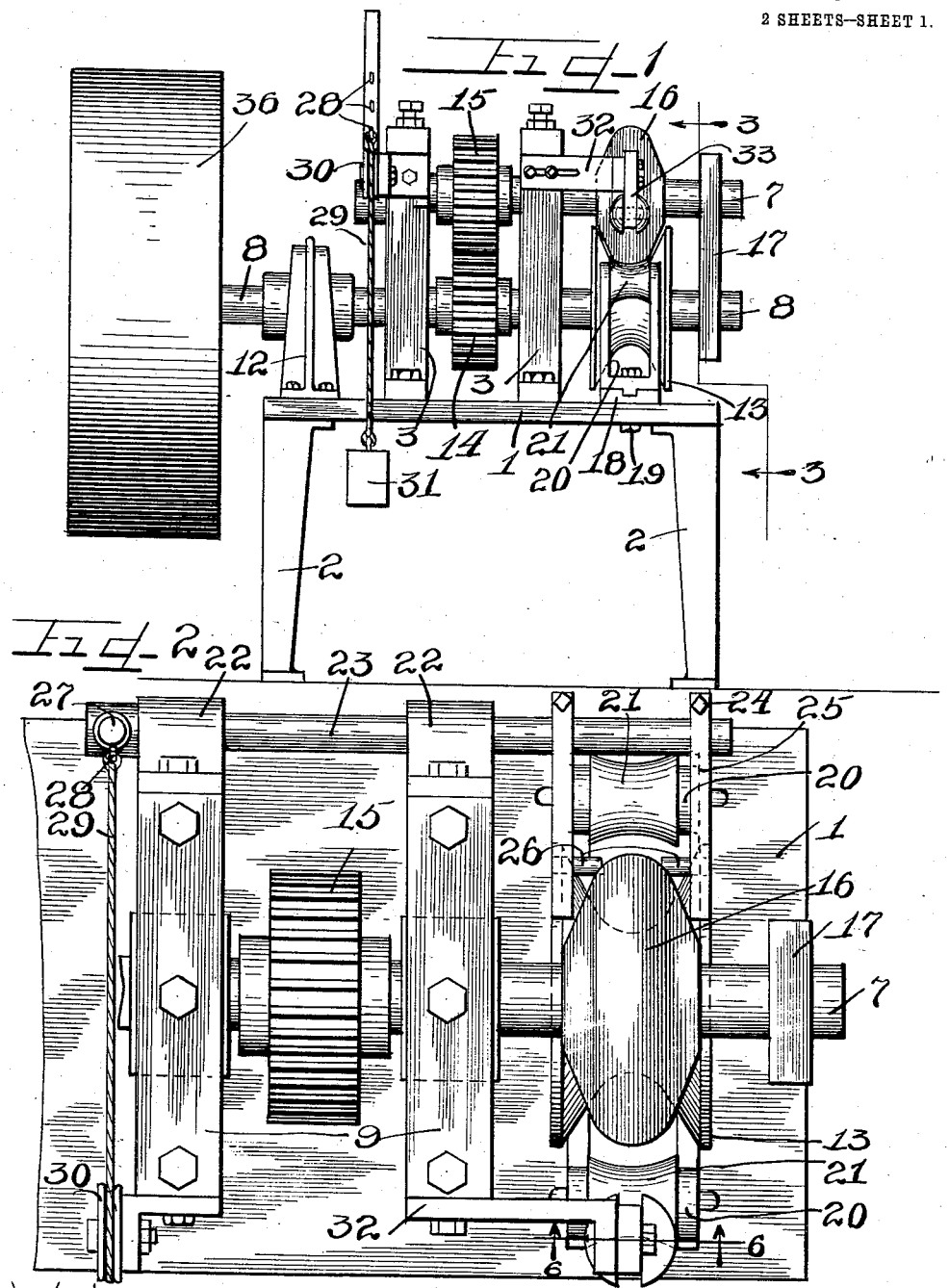

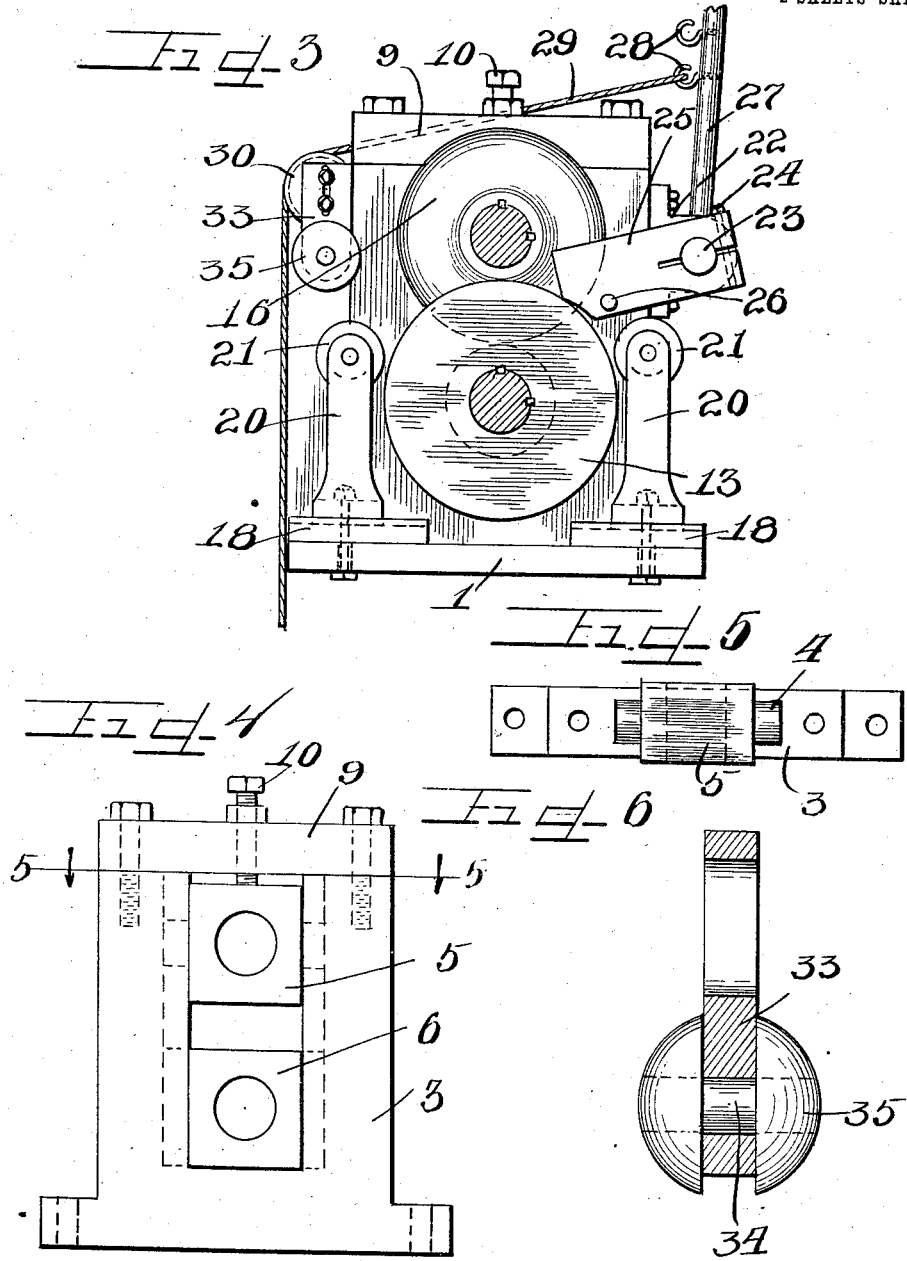

UNITED STATES PATENT OFFICE.

WALTER R. GREEN, OF CHICAGO, ILLINOIS.

SHEET-METAL-FORMING MACHINE.

1,068,893.  Specification of Letters Patent. Patented July 29, 1913.

Application filed August 19, 1912. Serial No. 715,732.

*To all whom it may concern:*

Be it known that I, WALTER R. GREEN, a citizen of the United States, and a resident of the city of Chicago, in the county of Cook and State of Illinois, have invented certain new and useful Improvements in Sheet-Metal-Forming Machines; and I do hereby declare that the following is a full, clear, and exact description of the same, reference being had to the accompanying drawings, and to the numbers of reference marked thereon, which form a part of this specification.

In the construction of sheet metal objects of many kinds, including automobile mud guards, dies have frequently been used. The operation, however, is unduly slow, and unnecessarily expensive in view of the size of the parts to be handled.

It is an object of this invention to afford a sheet metal forming machine adapted for use in rolling mud guards and the like, for automobiles, and capable, of course, of application to many other purposes in the construction of other forms.

It is a further object of the invention to afford a construction adapted to operate continuously and by the rolling process, to receive the strips of sheet metal thereinto and to deliver the same therefrom correctly formed for the use for which designed. In such machines heretofore it has been practically impossible to control the lateral grip of the metal in some instances, thus a large percentage of the product has been incorrectly formed, with serious loss to the manufacturer.

It is an important object of this invention to afford a construction whereby the metal is at all times directly guided to, and held in the forming rolls to insure a perfect product with each operation.

The invention (in a preferred form) is illustrated in the drawings, and hereinafter more fully described.

In the drawings: Figure 1 is a view in rear elevation of a device embodying my invention. Fig. 2 is a top plan view thereof. Fig. 3 is a section on line 3—3 of Fig. 1. Fig. 4 is an enlarged detail view illustrating the construction and mounting of the bearing. Fig. 5 is a section on line 5—5 of Fig. 4. Fig. 6 is an enlarged section on line 6—6 of Fig. 2.

As shown in the drawings: 1, indicates a table or frame, supported on legs 2, of any suitable kind or construction, as shown of cast metal. Mounted upon said table are bearing brackets 3, two in number, and arranged parallel face to face, and rigidly bolted upon the table. Each of said brackets comprises parallel uprights, having inwardly facing guide grooves therein, as shown in Figs. 4 and 5, and slidably mounted therein upon cylindric trunnions 4, are upper and lower bearing blocks 5 and 6, in which are journaled the upper and lower roll shafts 7 and 8. A cap piece 9, is secured by means of cap screws or other suitable means, across the bearing members 3, and provided with a set screw 10, which bears upon the upper bearing block 5, to exert pressure thereon.

As shown, the main driving shaft 8, is journaled in suitable bearings in an upwardly directed bracket 12, secured on the end of the table, and extends through the lower bearing blocks 6, and near its outer end is provided with a peripherally concave forming roll 13. Between said bearing members 3, a spur gear wheel 14, is rigidly secured on said shaft. A spur gear wheel 15, is rigidly secured on the upper roll shaft 7, to mesh with the spur gear wheel 14, before described. Also secured on said shaft 7, is a convex forming roll 16, complemental with, and adapted to interfit with the concave forming roll 13, on the lower shaft. A bearing member 17, provided with suitable bearing blocks therein of any desired kind, engages the outer ends of said shafts together to hold the same against the thrust of the rolls in forming the sheet.

Slidably mounted in a transverse slot in the table 1, at each side of the forming roll 13, is a block 18, having a groove therein extending longitudinally of the machine, and slidably supported therein by means of a clamping bolt 19, extending therethrough, is a bracket comprising upwardly directed parallel arms 20, having journaled therebetween at their upper end a concave roller 21. These are supported one on each side of the concave forming roll and are adjustable to or from the same by releasing the bolt 19, and sliding the same to the desired position, and, as shown, the bottom of the concavity in said guiding rollers lies substantially or nearly in a line with the bottom of the concavity in the forming roll 13.

Mounted upon the front face of the bearing members 3, near the top thereof, are brackets 22, in which is journaled a shaft 23. Adjustably secured on said shaft by means of clamping bolts 24, are guide and forming bars 25, which are directed rearwardly to the concave forming roll 13, and are shaped at their rear lower corners to fit thereto, as shown in Fig. 3, and conform to, and coact with the edges of said forming roll beyond the concavity therein, said edges for a short distance being concave. As shown, guide pins 26, are provided, one in each of said forming bars 25, near the inner end and lower edge thereof, and project inwardly. Rigidly secured on said shaft 23, is an upwardly extending lever 27, which may be of any desired length, and which may be provided in its length with a succession of hooks or eyes 28, directed rearwardly of the machine, and adapted to afford engagement for a cable 29, provided with an eye or hook to engage in said hooks 28, and laid rearwardly over a sheave 30, journaled on the rear side of the machine, and upon the lower end of which is supported a weight 31, whereby any desired tension may be exerted upon the guide and forming bars 25, to force the same downwardly upon each side of the sheet and thereby force the pins 26, downwardly upon the said sheet to engage and retain the edges of the same between the pin and the periphery of the concave forming roll near each face thereof.

As shown, a bracket 32, is adjustably secured upon the outer bearing member 3, and adjustably supported at the outer end thereof is a depending bracket or bar 33, which is slotted at its upper end to receive the bolts therethrough whereby the same is engaged to the bracket 32. A pintle 34 is journaled in a suitable aperture in the lower end of said bar, and rigidly secured on opposite ends thereof are spherically convex outwardly facing members 35, together affording a ball shaped guide member adapted to engage in the formed sheet to assist in guiding the same from the rolls.

Of course, the main driving shaft may be driven through the medium of a belt wheel or pulley 36, secured thereon, or by any other suitable means, and it is to be understood that forming rolls of different sizes, shapes or forms may be secured upon said shafts 7 and 8, by removing the outer bearing member 17, whereupon the forming rolls may be released from the shaft and others substituted; also, if desired, that the blocks 18, whereon the brackets 20, are supported, may be adjusted transversely of the table, and the brackets longitudinally thereof, thus enabling said brackets to be adjusted in any direction at will, and adapting the machine for general use as a forming machine of the class specified.

The operation is as follows: The sheet cut to the desired width and length, is fed into the machine over the front supporting and guide roll 21, and the end thereof directed between the guide and forming bars 25, beneath the pins 26, thereon, and into engagement with the forming roll. These rolls, by their rotation, draw the sheet therebetween, forming the same to the desired shape, and delivering the same rearwardly therefrom. The adjustable ball shaped guide member 35, engages in the groove or concavity in the sheet afforded by the rolls, and acts to steady the outer end thereof, which, of course, is turned upwardly because of the deformation of such sheet. Said guide and forming bars 25, serve as a gage, to direct the material between the rolls and guide the same true thereto, and are of sufficient length to afford a relatively long bearing upon the edges of the sheet, insuring accuracy of direction, while the pins thereon are of a length to retain engagement with the edges of the sheet as the same approach, and as the bending and forming thereof progresses. Of course, the pressure to be exerted by the guide and forming bars may vary with the gage of the metal to be formed, and it is desirable to exert sufficient pressure on the edges of the sheet to retain control thereof through the medium of said guide and forming bars, until well started through the rolls. With this in view, it is evident that the pressure exerted by said guide and forming bars may be varied at will by varying the adjustment of the cable to an upper or a lower hook 28, on the lever 27.

It is to be understood, of course, that different widths of material may be formed, it only being necessary to substitute a different size of forming roll in lieu of the forming rolls 13 and 16, before described, and adjusting the guide and forming bars 25, relatively each other by releasing the clamping bolts 24, to permit either or both of said bars to be adjusted along the shaft 23, to the desired position to insure accuracy of direction of the sheet to be formed to the rolls.

Of course, it is to be understood that the height at which the guide rolls 21, are supported relatively the forming rolls or their proximity thereto or both, may be varied to afford the desired bend or curvature of the material when passing through the forming rolls. Also, that said guide rolls may be positioned relatively the forming rolls as desired, owing to the longitudinal adjustment of the supporting blocks 18, therefor on the table, and the transverse adjustment of said brackets on said blocks as illustrated in Fig. 3.

I have shown but a preferred embodiment of my invention. I therefore do not purpose limiting the patent to be granted on this application for patent, otherwise than necessitated by the prior art, as obviously numerous details of construction and operation may be varied through a wide range without departing from the principles of this invention.

I claim as my invention:

1. A sheet metal forming machine embracing geared positively driven lower concave, and upper convex forming rolls, concave guide rolls adjustably supported at the front and rear of said rolls to deliver the material thereto, and receive the material therefrom, parallel adjustable guide bars at the front side of the forming rolls and acting to guide the sheet thereto, inwardly projecting pins on said guide bars to retain engagement of the edges of the sheet during the forming, and a lever engaged to said guide and forming bars and affording means for applying pressure to the edges of the sheet thereby.

2. A machine of the class described comprising positively driven upper and lower interfitting forming rolls, parallel guide bars adjustably and hingedly supported in advance of said forming rolls to deliver the end of the sheet to be formed thereto and guide the sheet therethrough, inwardly directed projections on said guide bars acting to retain engagement with the edges of the sheet during the forming, a lever rigidly connected with said guide bars and affording means for exerting pressure on the edges of the sheet thereby, concave guide rolls at the front and at the rear of the forming rolls, and an adjustably supported spherical guide member mounted to engage in the formed sheet to steady and guide the discharge end thereof.

3. A metal forming machine comprising parallel shafts, intermeshing gears thereon of equal size to drive the same simultaneously and oppositely, upper and lower forming rolls on said shaft adapted to interfit and to receive the sheet to be formed therebetween in forming the same, guide rolls at the front and rear of the forming rolls and adjustable relatively thereto and acting to support and guide the sheet in passing through the rolls, guide bars swingingly mounted in advance of the rolls and shaped at their free ends to fit to the periphery of the lower roll at each end thereof, and spaced apart a distance equal to the width of the sheet to be fed to the rolls, inwardly projecting guide pins on said guide bars near the free ends thereof adapted to retain engagement with the edges of the sheet during the forming, and means for applying a yielding pressure on said guide bars.

4. A device of the class described embracing forming rolls, guides in advance and at the rear thereof to support the metal to and from the rolls, guide bars swingingly mounted in advance of the rolls and spaced a distance apart equal to the width of the material to be fed to the rolls and shaped at their free ends to fit on the ends of the lower roll, projections thereon adjacent said roll for retaining engagement with the edges of the sheet, a lever rigidly engaged on said bars and projecting upwardly, a plurality of hooks thereon, one above the other, a cable adapted to be engaged at one end on any of said hooks, a sheave supported at the rear of the machine to receive said cable, a weight at the end of the cable acting to apply yielding pressure on said guide bars, and a convexly shaped guide member adjustably supported to fit in the sheet as formed, and to guide and steady the same as delivered from the machine.

5. In a machine of the class described the forming rolls, and levered guides therefor, concave guide rolls supported at the front and at the rear of the forming rolls, and a depending spherical guide member adjustably supported for engagement within the formed sheet at the rear of the forming rolls to steady and guide the same.

In testimony whereof I have hereunto subscribed my name in the presence of two subscribing witnesses.

WALTER R. GREEN.

Witnesses:
CHARLES W. HILLS, Jr.,
S. R. MEYER.

---

Copies of this patent may be obtained for five cents each, by addressing the "Commissioner of Patents, Washington, D. C."